United States Patent
Hymel

(10) Patent No.: US 6,990,524 B1
(45) Date of Patent: Jan. 24, 2006

(54) ACD MULTIMEDIA CUSTOMER CONTACT ROUTING WITH DELAY ANNOUNCEMENTS

(75) Inventor: Darryl Hymel, Batavia, IL (US)

(73) Assignee: Rockwell Electronic Commerce Technologies, LLC, Wood Dale, IL (US)

(*) Notice: Subject to any disclaimer, the term of this patent is extended or adjusted under 35 U.S.C. 154(b) by 0 days.

(21) Appl. No.: 09/505,318

(22) Filed: Feb. 16, 2000

Related U.S. Application Data

(60) Provisional application No. 60/122,278, filed on Mar. 1, 1999.

(51) Int. Cl.
*G06F 15/16* (2006.01)

(52) U.S. Cl. .................... 709/227; 709/206

(58) Field of Classification Search ............ 709/204, 709/223, 227, 201, 202, 206, 226, 224, 230, 709/238; 370/352, 259, 254, 431; 379/266, 379/265, 211, 220; 704/270, 275
See application file for complete search history.

(56) References Cited

U.S. PATENT DOCUMENTS

| | | | |
|---|---|---|---|
| 5,557,668 A | | 9/1996 | Brady |
| 5,721,770 A | * | 2/1998 | Kohler .................... 379/266 |
| 5,724,418 A | | 3/1998 | Brady |
| 5,793,861 A | | 8/1998 | Haigh |
| 5,848,143 A | | 12/1998 | Andrews et al. ............ 379/219 |
| 5,884,032 A | * | 3/1999 | Bateman et al. ............ 709/204 |
| 5,894,512 A | * | 4/1999 | Zenner ..................... 379/265 |
| 5,901,214 A | * | 5/1999 | Shaffer et al. ......... 379/211.02 |
| 5,910,983 A | * | 6/1999 | Dezonno et al. ............ 379/266 |
| 5,956,397 A | * | 9/1999 | Shaffer et al. ......... 379/220.01 |
| 5,991,394 A | | 11/1999 | Dezonno et al. ............ 379/265 |
| 5,999,965 A | * | 12/1999 | Kelly ..................... 709/202 |
| 6,021,428 A | * | 2/2000 | Miloslavsky .............. 709/206 |
| 6,064,667 A | * | 5/2000 | Gisby et al. .............. 370/352 |
| 6,141,328 A | * | 10/2000 | Nabkel et al. ............. 370/259 |
| 6,175,562 B1 | * | 1/2001 | Cave ...................... 370/352 |
| 6,226,678 B1 | * | 5/2001 | Mattaway et al. .......... 709/230 |
| 6,243,684 B1 | * | 6/2001 | Stuart et al. .............. 704/275 |
| 6,289,373 B1 | * | 9/2001 | Dezonno .................. 709/206 |
| 6,295,354 B1 | * | 9/2001 | Dezonno .................. 379/266 |
| 6,347,139 B1 | * | 2/2002 | Fisher et al. .......... 379/265.12 |
| 6,381,640 B1 | * | 4/2002 | Beck et al. ............... 709/223 |
| 6,393,481 B1 | * | 5/2002 | Deo et al. ................ 709/224 |
| 6,449,646 B1 | * | 9/2002 | Sikora et al. ............. 709/226 |
| 6,581,105 B2 | * | 6/2003 | Miloslavsky et al. ....... 709/238 |
| 6,788,649 B1 | * | 9/2004 | Dugan et al. .............. 370/254 |

FOREIGN PATENT DOCUMENTS

| | | |
|---|---|---|
| CA | 2178705 | 3/1997 |

(Continued)

OTHER PUBLICATIONS

Dong et al, Functional Architectural Design fro Internet Telephony Gateway, 2000;booch.sas.ntu.ac.sg:8080/iccs98b.ps.*

(Continued)

*Primary Examiner*—Thong Vu
(74) *Attorney, Agent, or Firm*—Welsh & Katz, Ltd.

(57) ABSTRACT

A method and apparatus are provided for routing multimedia calls within an automatic call distributor system having a automatic call distributor coupled to the public switched telephone network and a host coupled to the Internet. The method includes the steps of receiving an Internet call from an Internet caller by the host through the Internet, requesting an agent assignment for handling the Internet call from the automatic call distributor coupled to the public switched telephone network and transferring the Internet call to a terminal of the agent assigned by the automatic call distributor.

41 Claims, 2 Drawing Sheets

FOREIGN PATENT DOCUMENTS

EP           0 740 445 A2    10/1996
EP           0 829 996 A2    3/1998

OTHER PUBLICATIONS

Grigonis,Advanced Queuing Systems , Computer Telephony Mar. 1998.*

"Functional Architectural Desing for Internet Telephony Gateway", K.V. Chin, H. Dong, S.C. Hui and C.K. Yeo, School of Applied Sciences, Nanyan Technological University, Singapore.

"Inteview with the Virtual Empires" Richard Grigonis, Computer Telephony, Mar. 1998.

"The Next Generation Call Center", XP 00618796, Gary Paris, Siemens Business Communication Systems.

* cited by examiner

ACD MULTIMEDIA CUSTOMER CONTACT ROUTING WITH DELAY ANNOUNCEMENTS

FIELD OF THE INVENTION

This is a non provisional application, from provisional application Ser. No. 60/122,278, filed Mar. 1, 1999. The field of the invention relates to telecommunication systems and more particularly to automatic call distributors.

BACKGROUND OF THE INVENTION

Automatic call distribution systems are known. Such systems are typically used in an organizational context as a means of distributing telephone calls among a group of agents of the organization. Agents are typically segregated into groups to serve particular call targets within an organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the automatic call distributor (ACD) may distribute the calls based upon which agent position (telephone) has been idle the longest.

While ACDs are effective in handling phone calls, they typically provide no mechanism for handling inquiries and contacts through other mediums (e.g., e-mail, the Internet, etc.). Accordingly, a need exists for a method of coordinating agent activity for calls routing over a number of mediums.

SUMMARY

A method and apparatus are provided for routing multimedia calls within an automatic call distributor system having a automatic call distributor coupled to the public switched telephone network and a host coupled to the Internet. The method includes the steps of receiving an Internet call from an Internet caller by the host through the Internet, requesting an agent assignment for handling the Internet call from the automatic call distributor coupled to the public switched telephone network and transferring the Internet call to a terminal of the agent assigned by the automatic call distributor.

DETAILED DESCRIPTION OF A PREFERRED EMBODIMENT

Figure 1:
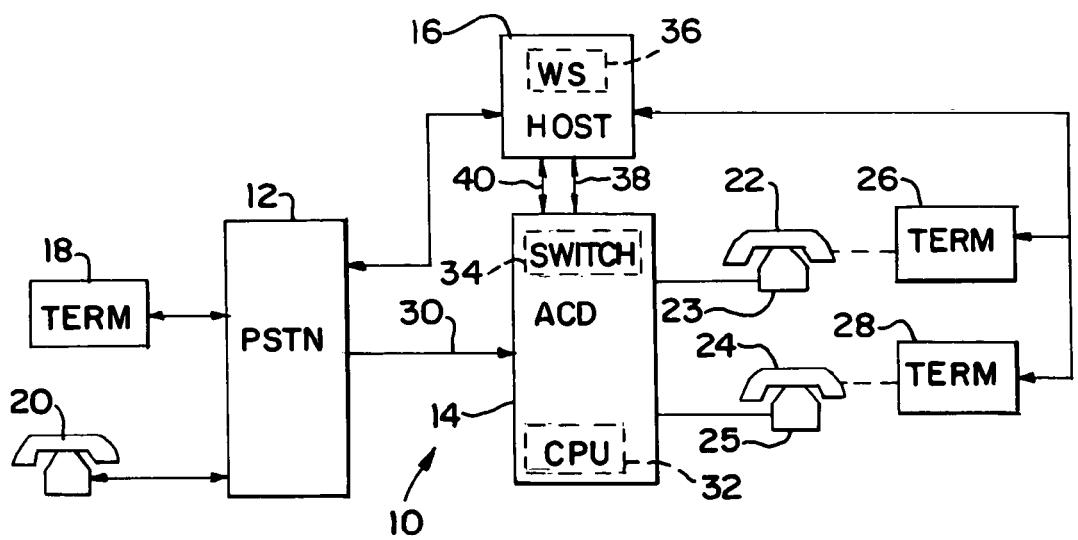
FIG. 1 is a block diagram of an automatic call distributor in accordance with an illustrated embodiment of the invention.

FIG. 1 is a block diagram of a telephone system 10, generally, in accordance with an illustrated embodiment of the invention. Under the illustrated embodiment, an automatic call distributor (ACD) 14 (e.g., a TRANSCEND ACD sold by Rockwell International) may receive calls from any of a number of callers 20 and automatically distribute the calls to any of a number of agents 22, 24.

Under the illustrated embodiment, calls may be received at the ACD 14 from the PSTN 12. As a call arrives, it may be delivered with associated call information (e.g., ANI, DNIS, etc.). As a call is detected, it may be assigned a unique call identification number by the ACD 14.

Based upon the associated call information, the ACD 14 may determine a call target intended by a caller (not shown)-calling from a remotely located telephone 20. For example, an operator (not shown) of the ACD system 10 may provide a number of telephone numbers based upon function (e.g., a first telephone number may be provided to contact sales, a second telephone number may be provided for service, etc.). A CPU 32 within the ACD 14 may identify the call target based upon a content of the associated call information.

Each call target may have a number of agents 22, 24 designated for handling calls to that call target. The agents 22, 24 designated for a particular call target together form an agent group.

Once a call target (and agent group) has been identified, the CPU 32 functions to identify an agent within the group to handle the call. Any of a number of algorithms may be used to identify the agent 22, 24. An agent may be designated based upon the most skilled for that call type or upon which agent has been idle the longest.

Once an agent has been identified, the CPU 32 may instruct a switch 34 within the ACD 14 to form a connection between a trunk line upon which the call was detected and the identified (designated) agent 22, 24.

The CPU 14 may also send a call completion message to the host 16. The call completion message may contain the associated call information, designated agent and call identifier to the host. The host 16 by reference to ANI information of the associated call information may identify customer records associated with that ANI information and display the identified call records on a terminal 26, 28 of the designated agent.

Figure 2:
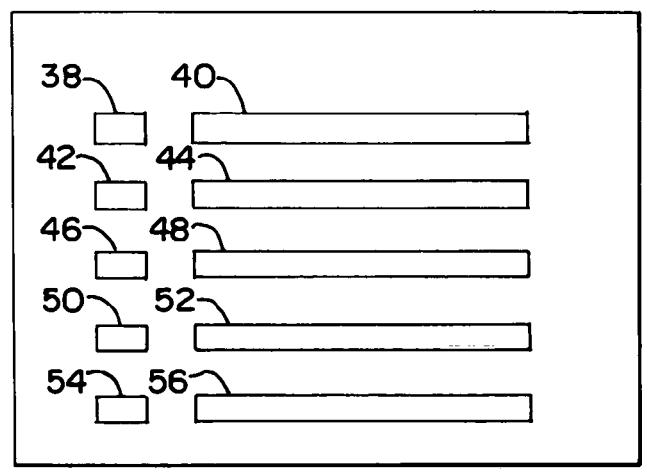
FIG. 2 depicts a webpage that may be used by the automatic call distributor of FIG. 1.

In accordance with another feature of the illustrated embodiment, the host 16 may maintain a website 36 for the convenience of customers. On the website 36, the host 16 may offer information (FIG. 2) on a number of products. The information may be provided in the form of an interactive webpage 58. A series of product options 40, 44, 48 may be provided in a first area of the webpage 58. A product option may be selected by activation of an associated softkey 38, 42, 46.

Alternatively, an product keyword may be entered into another area 52. Activation of an associated softkey 50 may cause a search engine (not shown) of the website 36 to search the website for information related to the entered keyword.

As a further alternative, a website user (also referred to herein as a caller) may request a conversation with an agent of the ACD system 10. A descriptive header 56 may be provided instructing the caller to activate a softkey 54 to initiate such conversation.

Figure 3:
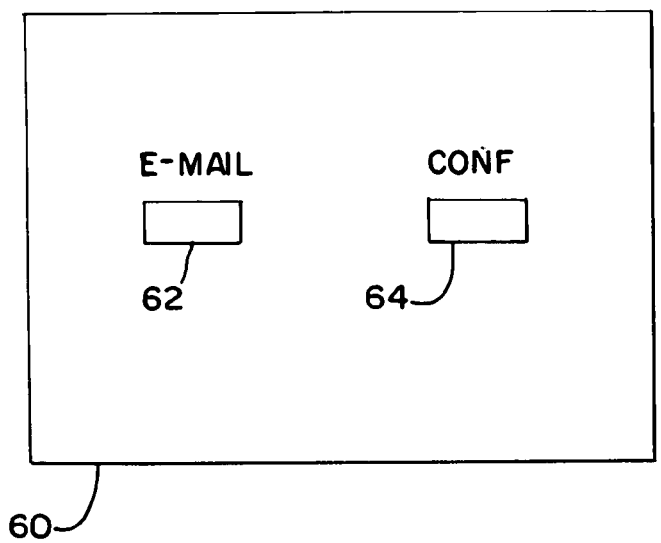
FIG. 3 depicts Internet options that may be used by the system of FIG. 1.

Upon activating the softkey 54 requesting a conversation, a conversational webpage 60 (FIG. 3) may be presented to the caller. The caller may be offered the option of initiating a off-line conversation using e-mail or a real-time conversation. The e-mail option may be initiated by activation of a softkey 62 with an e-mail label. A real-time conversation may be initiated by activation of a second softkey 64.

Upon activation of the e-mail softkey 62, a text box is presented to the caller within which the caller may enter a message. The text box may have associated text asking the caller for a name and a telephone number for a return call. Any text entered by the caller would be stored by the host 16 for subsequent response by an agent. A path for a return message may be provided by a telephone number entered by the caller or an agent may return the call as an e-mail message using an Internet Protocol (IP) address retrieved by the initial access request to the website 36 from the caller.

Alternatively, the caller may select a real-time conversation by activating the conference softkey 64. The conference softkey 64 may be used to activate features where the caller and assigned agent may exchange audio information as well as exchange text or drawings through an interactive window. The creation of the interactive audio and visual information may be executed under any of a number of different protocols (e.g., NetMeeting provided by Microsoft Corp.).

Under the illustrated embodiment, e-mail messages or real-time conferences are handled in a manner equivalent to a conventional telephone call. For example, a conventional call arrives over trunk lines 30, is assigned a call identifier and may be placed in a call queue maintained by the CPU 32. When an agent becomes available, the CPU 32 selects the agent and instructs the switch 34 to connect the call to the selected agent.

With regard to e-mail messages or real-time conferences, the host 16 may send a simulated call request to the CPU 32. The host 16 may send the call request over a TCP/IP connection 38 to a call application operating on the CPU 32 or may seize a connection on an incoming trunk 40 to the ACD 14 and send a set of simulated associated call information to the ACD 14.

In either case, the CPU 32 assigns a call identifier and assigns an agent to the call. Upon selection of an agent, the CPU 32 sends a call completion message to the host 16 including an identifier of the selected agent.

With the call completion message (and identity of the assigned agent), the host 16 may either forward the e-mail message from the caller or act to complete the real-time conference connection between the caller and assigned agent 22, 24.

Also, upon selecting an agent, the CPU 32 may instruct the switch 34 to connect the selected agent 22, 24 to a dummy load. Connection of the selected agent to a dummy load may be used to prevent the agent from being assigned to another call while the agent is handling the e-mail or real-time conference. A release button 23, 25 may be provided on a telephone of the agent 22, 24 to signal the CPU 32 when the e-mail or real-time conference is completed and the agent is ready for another call.

While the caller is waiting for assignment of an agent, a caller over a conventional voice channel may be presented with information and options regarding the call target. Similarly, a caller requesting a real-time conference may also be presented with information and options.

Figure 4:
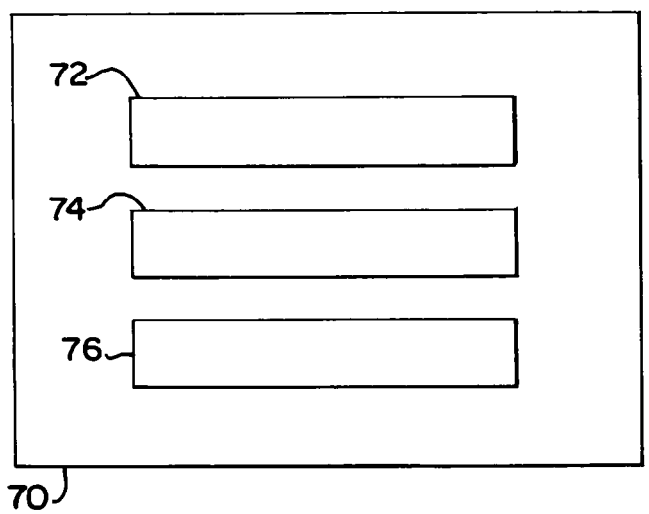
FIG. 4 depicts an information presentation window used by the system of FIG. 1.

For example, a screen 70 (FIG. 4) may be presented to a caller waiting for a real-time conference. A first window 72 may present information about the real-time conference. An estimated time may be presented as to the time remaining until an assigned agent would be available to participate in the conference. Alternatively, the first window may request information from caller (e.g., an account number, product information, etc.). A second window 74 may be provided for entry of information by the caller.

A third window 76 may be provided for presentation of graphics to the caller as the caller waiting for the real-time conference. A animated cartoon figure may provided for the amusement of the caller and to maintain the interest of the caller as the caller waits.

A specific embodiment of a method and apparatus for a method of allocating resources within an automatic call distributor has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of routing multimedia calls within an automatic call distributor system having a automatic call distributor coupled to the public switched telephone network and a host coupled to the Internet, such method comprising the steps of:
   the host providing an Internet caller with a conversational webpage that includes a first softkey for selecting an off-line conversation and a second softkey for selecting a real-time conversation;
   the host receiving an Internet call from the Internet caller through the Internet based upon activation by the Internet caller of one of the first and second softkeys;
   the host requesting an agent assignment for handling the Internet call from the automatic call distributor coupled to the public switched telephone network; and
   the host transferring the Internet call to a terminal of the agent assigned by the automatic call distributor.

2. The method of routing multimedia calls as in claim 1 further comprising queuing the request for an agent assignment.

3. The method of routing multimedia calls as in claim 1 wherein the step of queuing the request for an agent assignment further comprises estimating a time length of the queue.

4. The method of routing multimedia calls as in claim 3 wherein the step of estimating a time length of the queue further comprises transferring the estimated time to the Internet caller.

5. The method of routing multimedia calls as in claim 1 wherein the step of transferring the Internet call to the agent assigned by the automatic call distributor further comprises setting up a real-time Internet conference with the caller.

6. The method of routing multimedia calls as in claim 5 wherein the step of setting up the real-time Internet conference with the caller further comprises exchanging audio and text between the assigned agent and Internet caller through an interactive window.

7. The method of routing multimedia calls as in claim 5 wherein the step of setting up a real-time conference with the caller further comprises presenting an information screen to the caller about the real-time call.

8. The method of routing multimedia calls as in claim 5 wherein the step of presenting the information screen to the caller further comprises presenting an estimated time until an assigned agent will be available to participate in the conference.

9. The method of routing multimedia calls as in claim 5 wherein the step of presenting the information screen to the caller about the real-time call further comprises presenting an information request screen to the Internet caller.

10. The method of routing multimedia calls as in claim 5 wherein the step of presenting the information screen to the caller further comprises presenting an animated cartoon figure for entertaining the Internet caller while the caller waits for completion of setup of the real-time conference.

11. The method of routing multimedia calls as in claim 1 wherein the step of requesting an agent assignment for handling the Internet call from the automatic call distributor further comprises seizing a connection on an incoming trunk to the automatic call distributor and sending simulated call associated information to the automatic call distributor.

12. The method of routing multimedia calls as in claim 1 wherein the step of requesting an agent assignment for handling the Internet call from the automatic call distributor further comprises sending the request over a TCP/IP connection to a call application operating within the automatic call distributor.

13. The method of routing multimedia calls as in claim 12 wherein the step of transferring the Internet call to the agent assigned by the automatic call distributor further comprises connecting a telephone of the assigned agent to a dummy load to avoid assigning the assigned agent to another call during the Internet call.

14. A system for routing multimedia calls within an automatic call distributor system having a automatic call distributor coupled to the public switched telephone network and a host coupled to the Internet, such apparatus comprising:
   means within the host for providing an Internet caller with a conversational webpage that includes a first softkey for selecting an off-line conversation and a second softkey for selecting a real-time conversation;
   means within the host for receiving an Internet call from the Internet caller through the Internet based upon activation of one of the first and second softkeys;
   means within the host for requesting an agent assignment for handling the Internet call from the automatic call distributor; and
   means within the host for transferring the Internet call to the agent assigned by the automatic call distributor.

15. The apparatus for routing multimedia calls as in claim 14 further comprising means for queuing the request for an agent assignment.

16. The apparatus for routing multimedia calls as in claim 14 wherein the means for queuing the request for an agent assignment further comprises means for estimating a time length of the queue.

17. The apparatus for routing multimedia calls as in claim 16 wherein the means for estimating a time length of the queue further comprises means for transferring the estimated time to the Internet caller.

18. The apparatus for routing multimedia calls as in claim 14 wherein the means for transferring the Internet call to the agent assigned by the automatic call distributor further comprises means for setting up a real-time Internet conference with the caller.

19. The apparatus for routing multimedia calls as in claim 18 wherein the means for setting up the real-time Internet conference with the caller further comprises means for exchanging audio and text between the assigned agent and Internet caller through an interactive window.

20. The apparatus for routing multimedia calls as in claim 18 wherein the means for setting up a real-time conference with the caller further comprises means for presenting an information screen to the caller about the real-time call.

21. The apparatus for routing multimedia calls as in claim 18 wherein the means for presenting the information screen to the caller further comprises means for presenting an estimated time until an assigned agent will be available to participate in the conference.

22. The apparatus for routing multimedia calls as in claim 18 wherein the means for presenting the information screen to the caller about the real-time call further comprises means for requesting information from the Internet caller.

23. The apparatus for routing multimedia calls as in claim 18 wherein the means for presenting the information screen to the caller further comprises means for presenting an animated cartoon figure for entertaining the Internet caller.

24. The apparatus for routing multimedia calls as in claim 14 wherein the means for requesting an agent assignment for handling the Internet call from the automatic call distributor further comprises means for seizing a connection on an incoming trunk to the automatic call distributor and sending simulated call associated information to the automatic call distributor.

25. The apparatus for routing multimedia calls as in claim 14 wherein the means for requesting an agent assignment for handling the Internet call from the automatic call distributor further comprises means for sending the request over a TCP/IP connection to a call application operating within the automatic call distributor.

26. The apparatus for routing multimedia calls as in claim 25 wherein the means for transferring the Internet call to the agent assigned by the automatic call distributor further comprises means for connecting a telephone of the assigned agent to a dummy load.

27. A system for routing multimedia calls within an automatic call distributor system having a automatic call distributor coupled to the public switched telephone network and a host coupled to the Internet, such apparatus comprising:
   a conversational webpage provided by the host to an Internet caller that includes a first softkey for selecting an off-line conversation and a second softkey for selecting a real-time conversation;
   the host adapted to receive an Internet call from the Internet caller through the Internet based upon activation of one of the first and second softkeys;
   an agent processor operating from within the host and adapted to request an agent assignment for handling the Internet call from the automatic call distributor; and
   a routing processor adapted to transfer the Internet call to a terminal of the agent assigned by the automatic call distributor.

28. The apparatus for routing multimedia calls as in claim 27 further comprising a queuing processor adapted to queue the request for an agent assignment.

29. The apparatus for routing multimedia calls as in claim 27 wherein the routing processor further comprises an Internet conferencing protocol for setting up a real-time Internet conference with the caller.

30. The apparatus for routing multimedia calls as in claim 29 wherein the conferencing protocol further comprises an interactive window adapted to exchanging audio and text between the assigned agent and Internet caller through the Internet.

31. The apparatus for routing multimedia calls as in claim 29 wherein the conferencing protocol further comprises an information screen adapted to present information to the caller about the real-time call.

32. The apparatus for routing multimedia calls as in claim 29 wherein the information screen further comprises a timer adapted to provide an estimated time until an assigned agent will be available to participate in the conference.

33. The apparatus for routing multimedia calls as in claim 29 wherein the information screen further comprises an information entry window adapted to request information from the Internet caller.

34. The apparatus for routing multimedia calls as in claim 29 wherein the information screen to the caller further comprises an animated cartoon figure for entertaining the Internet caller.

35. A method of routing multimedia calls within an automatic call distributor system having a automatic call distributor coupled to the public switched telephone network and a host coupled to the Internet, such method comprising the steps of:
   the host providing an Internet caller with a conversational webpage that includes a first softkey for selecting an off-line conversation and a second softkey for selecting a real-time conversation;
   the host receiving an Internet call from the Internet caller through the Internet based upon activation by the Internet caller of one of the first and second softkeys;
   requesting an agent assignment from the automatic call distributor; and
   queuing the Internet call in a common call queue along with other calls received through the public switched telephone network based upon a time of arrival.

36. The method of routing multimedia calls as in claim 35 further comprising routing the Internet call to an assigned agent when the queued Internet call reaches a front of the queue.

37. The method of routing multimedia calls as in claim 35 wherein the step of routing the Internet call to an agent when the queued Internet call reaches a front of the queue further comprises sending an Internet address of the Internet caller to the assigned agent.

38. The method of routing multimedia calls as in claim 35 further comprises estimating a time period before the queued Internet call will reach a front of the queue.

39. The method of routing multimedia calls as in claim 38 wherein the step of estimating a time period before the queued Internet call will reach a front of the queue further comprises transferring the estimate to the Internet caller.

40. A method of routing multimedia calls within an automatic call distributor system having an automatic call distributor coupled to the public switched telephone network and a host coupled to the Internet, such method comprising the steps of:
   the host providing an Internet caller with a conversational webpage that includes a first softkey for selecting an off-line conversation and a second softkey for selecting a real-time conversation;
   the host receiving an Internet call from the Internet caller through the Internet based upon activation of one of the first and second softkeys;
   requesting an agent assignment for handling the Internet call from the automatic call distributor; and
   transferring the Internet call to the agent assigned by the automatic call distributor.

41. A method of displaying information to a caller of an automatic call distributor, such method comprising the steps of:
   the host providing the caller with a conversational webpage that includes a first softkey for selecting an off-line conversation and a second softkey for selecting a real-time conversation;
   the host receiving a request for a real-time conference from the caller based upon activation of the second softkey;
   the host sending a call request to the automatic call distributor for an agent to handle the real-time conference; and
   the host presenting graphical information to the caller as the caller waits for setup of the real-time conference.

* * * * *